United States Patent
Zhou et al.

(10) Patent No.: US 7,699,911 B2
(45) Date of Patent: Apr. 20, 2010

(54) OZONE RESISTANT $O_2/N_2$ SEPARATION MEMBRANES

(75) Inventors: Shaojun J. Zhou, Palatine, IL (US); Stephen F. Yates, Arlington Heights, IL (US)

(73) Assignee: Honeywell International Inc., Morristown, NJ (US)

( * ) Notice: Subject to any disclaimer, the term of this patent is extended or adjusted under 35 U.S.C. 154(b) by 454 days.

(21) Appl. No.: 11/744,165

(22) Filed: May 3, 2007

(65) Prior Publication Data
US 2008/0271604 A1 Nov. 6, 2008

(51) Int. Cl.
*B01D 53/22* (2006.01)
(52) U.S. Cl. ............ 96/11; 96/4; 96/8; 96/10; 96/12; 96/13; 96/14; 95/45; 95/51; 95/54; 55/524; 210/640; 210/650; 423/219
(58) Field of Classification Search ............ 96/4, 96/8, 10, 11, 12, 13, 14; 95/45, 51, 54; 55/524; 210/640, 641, 650; 423/219
See application file for complete search history.

(56) References Cited

U.S. PATENT DOCUMENTS

| | | | |
|---|---|---|---|
| 4,348,360 A | 9/1982 | Chang et al. | |
| 4,627,859 A | 12/1986 | Zupancic et al. | |
| 4,695,483 A | 9/1987 | Zupancic et al. | |
| 4,859,215 A * | 8/1989 | Langsam et al. | 95/54 |
| 4,871,494 A | 10/1989 | Kesting et al. | |
| 4,874,401 A | 10/1989 | Jeanes | |
| 4,948,400 A * | 8/1990 | Yamada et al. | 96/10 |
| 4,961,760 A | 10/1990 | Caskey et al. | |
| 5,073,175 A * | 12/1991 | Anand et al. | 96/10 |
| 5,202,023 A * | 4/1993 | Trimmer et al. | 96/8 |
| 5,422,331 A | 6/1995 | Galligan et al. | |
| 5,423,902 A | 6/1995 | Strutz et al. | |
| 5,670,255 A * | 9/1997 | Temple et al. | 428/392 |
| 5,700,375 A * | 12/1997 | Hagen et al. | 95/45 |
| 6,168,648 B1 | 1/2001 | Ootani et al. | |
| 6,197,269 B1 | 3/2001 | Jansen et al. | |
| 6,387,163 B1 | 5/2002 | Leong et al. | |
| 6,395,071 B1 * | 5/2002 | Nijima et al. | 96/12 |
| 6,497,752 B1 * | 12/2002 | Kessler et al. | 96/10 |
| 6,605,133 B1 | 8/2003 | Li et al. | |
| 6,916,358 B2 | 7/2005 | Nakamura et al. | |
| 7,081,153 B2 | 7/2006 | Leigh et al. | |
| 7,152,635 B2 | 12/2006 | Moravec et al. | |
| 7,175,692 B2 | 2/2007 | Schwalm | |
| 7,462,223 B2 * | 12/2008 | Kiefer et al. | 96/4 |
| 2004/0195174 A1 * | 10/2004 | Bonk et al. | 96/4 |

* cited by examiner

*Primary Examiner*—Jason M Greene
(74) *Attorney, Agent, or Firm*—Oral Caglar, Esq.

(57) ABSTRACT

Ozone resistant $O_2/N_2$ gas separation membranes comprise a polymer membrane and an ozone reacting component, such as an antioxidant. The antioxidant may be included in the support layer of a composite membrane or included in the entire structure of an asymmetric membrane. The antioxidants in the separation membrane reduce oxidation and deterioration of the actual separation layer of the membrane.

17 Claims, 2 Drawing Sheets

US 7,699,911 B2

OZONE RESISTANT O₂/N₂ SEPARATION MEMBRANES

BACKGROUND OF THE INVENTION

The present invention generally relates to separation membranes and, more particularly, to ozone resistant separation membranes for Nitrogen Generating Systems (NGS).

Separation membranes have been used in air separation modules (ASM) of NGS, such as On Board Inert Gas Generating Systems (OBIGGS). OBIGGS have been used in aircraft to protect against fuel tank explosions by replacing the potentially explosive fuel vapor/air mixture above the fuel in the ullage space of the tanks with nitrogen enriched air (NEA). The OBIGGS passes air (e.g. bleed air) through the ASM, generating the NEA and a stream of oxygen enriched air (OEA). The resulting NEA can be used to inert fuel tanks while the OEA can be vented overboard or recaptured.

Separation membranes are based on permeable membrane (PM) technology. Permeation of a gas, such as oxygen, through a membrane is generally considered to be the product of the diffusivity of that gas through the membrane and the solubility of that gas in the membrane material. Oxygen is separated from the bleed air because the membrane is more permeable to oxygen than to nitrogen. As the bleed air travels through the ASM, the NEA flow is generated by the loss of oxygen via permeation through the separation membrane.

At cruising altitude, the ozone concentration of the air can reach 1 ppm or higher. Under such conditions, the separation membranes made of polymeric materials tend to break down due to oxidation. Membrane deterioration negatively affects the gas separating properties of the membrane. Various methods for removing ozone from the air stream have been described in the prior art.

In aircraft, ozone removal has been accomplished by passing the air through a bed of carbon granules. Unfortunately, carbon and similar ozone removal materials are not fully acceptable for some applications since these materials are consumed in the filtration process and it is often difficult to ascertain when these materials have reached the end of their useful life. Additionally, the carbon beds are heavy and they create a high pressure drop.

Ozone decomposing catalysts have been used for many applications, such as air purification systems and water disinfection applications. When compared with the ozone removal materials, catalysts have much longer operating lives and generate less waste.

In U.S. Pat. No. 4,348,360, a catalytic converter for ozone removal in aircraft is disclosed. The described catalytic converter comprises an aluminum honeycomb core, a tubular metal shell surrounding the core and affixed thereto, metal rib support members fastened to the shell and to the honeycomb core, and a catalytic coating deposited upon the cell walls of the honeycomb core.

In lieu of the honeycomb core described in the '360 patent, other catalytic converters for ozone removal have included substrates made from fibers, pellets, or particles which are metallic or a metal coated ceramic material.

Catalytic converters for ozone removal have been used in aircraft inerting systems. In U.S. Pat. No. 7,152,635, an inerting system for an aircraft is disclosed. In the described system, an ozone converter is positioned upstream of the ASM to improve life and reliability of the ASM. If the ozone converter system fails or provides incomplete ozone conversion, ozone can pass to the ASM and damage the separation membrane.

In U.S. Pat. No. 5,422,331, a layered catalyst composition is disclosed. The described composition contains an undercoat layer that provides adherence to substrates and an overlayer on which is dispersed one or more catalytic metal components. The composition is described as especially well adapted for use in aircraft. In air handling systems, the substrate on which the layered catalyst composition is coated need not be a honeycomb-type carrier or other substrate specifically configured to support a catalyst, but the layered catalyst composition could be applied to any portion of the air handling system in which the air sustains turbulent flow. Thus, the layered catalyst composition may be applied to the blades of an air handling fan or compressor, to a grill, louvers or other air-directing structure, or on other structures over which the air of the air handling system is forced in turbulent flow. For some applications, suitable substrates may not be available. Additionally, the reactor temperature or residence time may not be sufficient to provide complete ozone conversion. In some situations, the catalytic material applied to substrates specifically configured to support the catalyst (e.g., honeycomb carriers) or to system substrates (e.g., compressor blades) is not sufficient to provide complete ozone conversion. Furthermore, ozone conversion in the catalytic system can never reach 100%. Under these situations, ozone can damage the separation membranes of the NGS, which in turn can lead to dangerous conditions within the fuel tank.

As can be seen, there is a need for an ozone resistant membrane or an improved ozone removal system. There is also a need to improve ozone removal from the air stream and reduce separation membrane damage caused by ozone.

SUMMARY OF THE INVENTION

In one aspect of the present invention, an apparatus comprises a gas separation membrane; and an ozone reacting component incorporated in the gas separation membrane.

In another aspect of the present invention, an asymmetric membrane comprises a porous region; a separating region integral to the porous region; and an ozone reacting component incorporated in the porous region and the separating region.

In a further aspect of the present invention, a composite membrane comprises a support layer; a separating layer in contact with the support layer; and an ozone reacting component incorporated in the support layer.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention provides gas separation membranes and methods for providing an inert gas flow. Embodiments of the present invention may find beneficial use in industries such as the automotive, electricity generation and aerospace industries. Embodiments of the present invention may be beneficial in applications including manufacturing and repair of aerospace components. Embodiments of the present invention may be useful in applications including inerting fuel tanks and other compartments, such as cargo holds. Embodiments of the present invention may be useful in any gas separation application including, but not limited to, NGS such as OBIGGS.

In one embodiment, the present invention provides ozone resistant $O_2/N_2$ gas separation membranes. The separation membranes may comprise a polymer membrane and an ozone reacting component, such as an antioxidant. The antioxidant may be included in the support layer of a composite membrane or included in the entire structure of an asymmetric membrane. The antioxidants in the separation membrane may prevent the actual separation layer of the membrane from oxidizing and deteriorating. Unlike the prior art separation membranes that do not include antioxidants, ozone conversion can occur at the membrane without having a negative effect on the separation properties of the membrane. For prior art membranes, ozone removal must occur upstream of the membrane to prevent ozone related membrane deterioration.

Figure 1A:
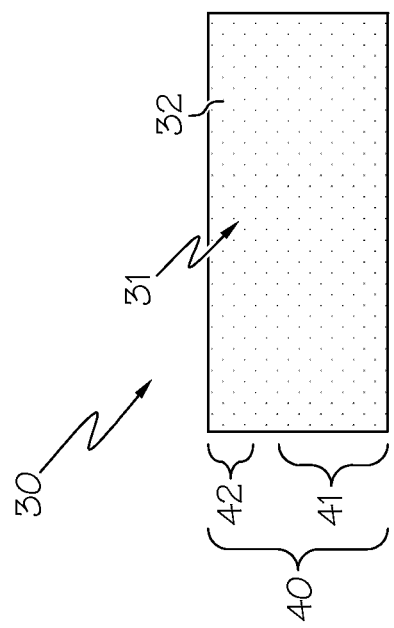
FIG. 1a is a cross-section view of an ozone resistant gas separation membrane according to one embodiment of the present invention.

An ozone resistant gas separation membrane 30, according to an embodiment of the present invention, is shown in FIG. 1a. The ozone resistant gas separation membrane 30 can comprise a gas separation membrane 31 and an ozone reacting component 32 incorporated therein.

The gas separation membrane 31 may comprise a polymer gas separation membrane. Useful polymers may include polysulfones, polyethers, polyamides, polycarbonates, polyethersulfones, polysilicones, polyimides, polyetherimides, polyestercarbonates, copolymers incorporating these polymer types, and mixtures thereof. For some applications, useful gas separation membranes 31 may include the gas separation membranes described in U.S. Pat. No. 4,874,401, which is incorporated herein by reference. For some applications, useful gas separation membranes 31 may include the polyetherimide membranes described in U.S. patent application Ser. No. 10/892/881, which was filed on Jul. 16, 2004, and which is incorporated herein by reference.

The gas separation membrane 31, as depicted in FIG. 1a, can comprise an asymmetric membrane 40. The asymmetric membrane 40 may comprise a porous region 41 and a separating region 42. The porous region 41 may provide support to the separating region 42 and may offer little, if any, resistance to passage of gases. The separating region 42 may comprise a relatively thin, dense active layer. In other words, the separating region 42 may be the portion of the gas separation membrane 31 that is designed to separate the gases. The porous region 41 may be integral to the separating region 42. For asymmetric membranes 40, the ozone reacting component 32 may be included in the entire structure of the gas separation membrane 31. The ozone reacting component 32 may be included in the porous region 41 and the separating region 42.

Figure 1B:
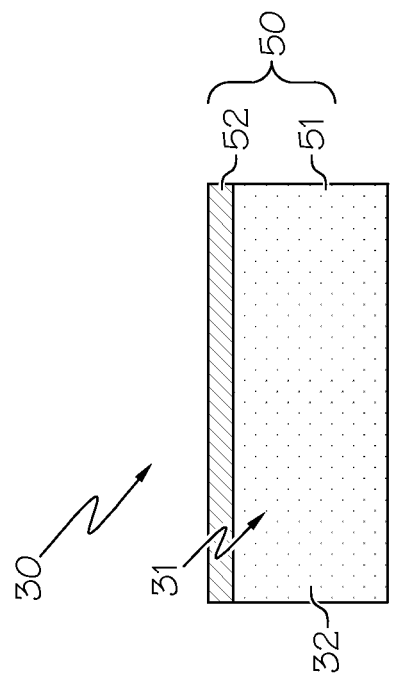
FIG. 1b is a cross-section view of an ozone resistant gas separation membrane according to another embodiment of the present invention.

Alternatively, the gas separation membrane 31, as depicted in FIG. 1b, can comprise a composite membrane 50. The composite membrane 50 may comprise a support layer 51 and a separating layer 52. The support layer 51 may be in contact with and may provide support to the separating layer 52 and may offer little, if any, resistance to passage of gases. The separating layer 52 may comprise a relatively thin, dense active layer. In other words, the separating layer 52 may be the portion of the gas separation membrane 31 that is designed to separate the gases. For composite membranes 50, the ozone reacting component 32 may be included in the support layer 51 of the gas separation membrane 31, or in the entire structure of the gas separation membrane 31.

The gas separation membranes 31 may be shaped in the form of flat sheets, hollow fibers, or hollow tubes. Some flat sheet membranes may be used in a spiral wound configuration to increase surface area for gas separation. Hollow fiber membranes may provide greater surface than flat sheet membranes and may be useful for some applications.

The gas separation membranes 31 may be produced by known separation membrane forming techniques. For example, asymmetric hollow fiber type membranes may be formed by dissolving the polymers in a solvent solution; creating a dope or spinning dope of the solvent system and polymers; configuring the dope into a form suitable for use as an asymmetric gas separation membrane; spinning the dope through a tube-in-orifice spinneret and injecting a coagulation fluid through the orifice; coagulating the formed dope in a coagulating medium; desolvating the resulting formed asymmetric gas separation membrane; and drying the gas separation membrane 31. As another example, composite flat sheet membranes may be formed by casting the separating layer 52 and adhering the separating layer 52 to the support layer 51. Alternatively, the support layer 51 can be the surface upon which the separating layer 52 is cast or laminated. Useful methods for producing the gas separation membranes 31 may include the membrane forming methods described in U.S. Pat. Nos. 4,627,859; 4,695,483; 4,871,494; 4,874,401; and 4,961,760, all of which are incorporated herein by reference.

The ozone reacting component 32 may be incorporated into the gas separation membrane 31 during the membrane manufacturing process. The ozone reacting component 32 can be chosen so that it dissolves in the solvent system of the wet spinning process but is not water soluble and thus can not be easily extracted during later processing of the membrane. It is also preferable if the ozone reacting component 32 is not very volatile. For example, when the gas separation membrane 31 comprises polyetherimide, the ozone reacting component 32 may comprise linear or cyclic polyolefins containing eight or more carbons.

The ozone reacting components 32 may comprise antioxidants (ex. phosphite esters and organic sulfides) and compounds that are not normally included as antioxidants (ex. olefins and polyolefins). The ozone reacting component 32 may be selected such that the ozone reacts more quickly with the ozone reacting component 32 than with the polymers of the gas separation membrane 31. For example, when the gas separation membrane 31 is polysulfone, the ozone reacting component 32 may comprise isoprenoid hydrocarbons such as limonene and pinene, or low molecular weight polybutadienes or polyisoprenes.

Ozone ($O_3$) is an allotropic form of oxygen and is much more active chemically than ordinary oxygen ($O_2$). It is formed photochemically from oxygen in the Earth's atmosphere, and decomposes either thermally or photochemically back to the more stable diatomic oxygen. As a result of this photochemical reaction, ozone is normally present in the Earth's atmosphere at high altitudes.

Ozone can act as a 1,3-dipole, an electrophilic agent and a nucleophilic agent during reactions. Ozone can undergo a 1-3 dipolar cyclo addition with compounds having double or triple bonds. This leads to the formation of an ozonide. Ozonides are also thermally and hydrolytically unstable. Hydrolysis of the ozonide results in cleavage of the compound at the ozone addition site, the double or triple bond. Electrophilic reactions can occur with aromatic compounds. Aromatic compounds that are substituted by electron donors (such as OH and $NH_2$) may have a high electron density on the carbon compounds in the ortho and para positions. In these positions aromatic compounds can react actively with ozone. Nucleophilic reactions may take place where there is a shortage of electrons and particularly with carbon compounds that contain electron-withdrawing groups (e.g. —Cl, —$NO_2$, —COOH).

The ozone reacting components 32 may comprise antioxidants that act as sacrificial reductants, scavenging and destroying the ozone before it can attack the polymer it is protecting. Useful antioxidants that act as sacrificial reductants may include phosphite esters, organic sulfides, or aromatic amines. For some embodiments, the ozone reacting components 32 may comprise antioxidants that act as free radical inhibitors, for example, butyrated hydroxytoluene (BHT); however, free radical inhibitors may not be suitable for some applications because free radical processes may be less important to ozone oxidation. Useful antioxidants may include compounds that are readily oxidized, including phosphite esters, organic sulfides, retinol, isoprenoid hydrocarbons such as limonene and pinene, or low molecular weight polybutadienes or polyisoprenes.

In general, ozone may react quickly with organic compounds that contain double bonds, activated aromatic groups or amines. Ozone may be more reactive with unsaturated polymers than saturated polymers, but all carbon backbone polymers may be reactive.

The ozone reacting component 32 may comprise any compound that can protect the polymers of the gas separation membrane 31 from ozone deterioration. The ozone reacting component 32 may comprise a compound having a double bond, activated aromatic group, amine or phosphite or sulfide groups. The ozone reacting component 32 may vary by application and may depend on the composition of the polymers of the gas separation membrane 31. The ozone reacting component 32 may comprise any compound that reacts with ozone more quickly than ozone reacts with the polymers of the gas separation membrane 31. For example, when the gas separation membrane 31 includes polyetherimides, the ozone reacting component 32 may include polyolefins. Useful polyolefins may include the polyolefin antioxidants described in U.S. Pat. No. 5,670,255, which is incorporated herein by reference. For some applications, useful ozone reacting components 32 may include compounds that are neither themselves nor their oxidation products volatile, for example, retinol. For some applications, useful ozone reacting components 32 may include compounds that neither themselves nor their oxidation products generate hazardous chemical compounds, for example, phosphite esters.

The ozone reacting component 32 may be incorporated into the gas separation membrane 31 in a low enough concentration that their presence does not adversely affect the performance of the gas separation membrane 31. A concentration that does not adversely affect the performance of the gas separation membrane 31 may be a concentration that does not prevent the gas separation membrane 31 from providing gas separation (i.e. NEA and OEA streams). In other words, the concentration of the ozone reacting component 32 may be such that the oxygen/nitrogen selectivity (or separation factor) of the ozone resistant gas separation membrane 30 is at least about 2. As is known in the art, the oxygen/nitrogen selectivity is a measure of the ratio of oxygen flux to nitrogen flux at the same temperature. Embodiments of the present invention may have an oxygen flux at ambient temperature of greater than about 5 GPU (gas permeation units).

The ozone reacting component 32 may be incorporated into the gas separation membrane 31 in a concentration that is useful and effective. A useful and effective concentration may be a concentration such that during operation at least one ozone molecule may be destroyed by the ozone reacting component 32, thereby preventing said ozone molecule from reacting with the polymers of the gas separation membrane 31. The ozone reacting component 32 may protect the polymers of the active layer of the gas separation membrane 31.

The concentration of the ozone reacting component 32 may vary with application and may depend on the composition of the gas separation membrane 31 and the composition of the ozone reacting component 32. For example, when the gas separation membrane 31 comprises polyetherimide and the ozone reacting component 32 comprises isoprenoid hydrocarbons such as limonene and pinene, or low molecular weight polybutadienes or polyisoprenes, the concentration of the ozone reacting component 32 may be about 0.01 to 10% by weight of the ozone resistant gas separation membrane 30. Typically, the ozone reacting component 32 may comprise less than about 10% by weight of the ozone resistant gas separation membrane 30. For some applications, the ozone reacting component 32 may comprise less than about 5% by weight of the ozone resistant gas separation membrane 30. For some applications, the ozone reacting component 32 may comprise between about 1% and about 5% by weight of the ozone resistant gas separation membrane 30. For some NGS applications, the ozone reacting component 32 may comprise less than about 1% by weight of the ozone resistant gas separation membrane 30.

Figure 2:
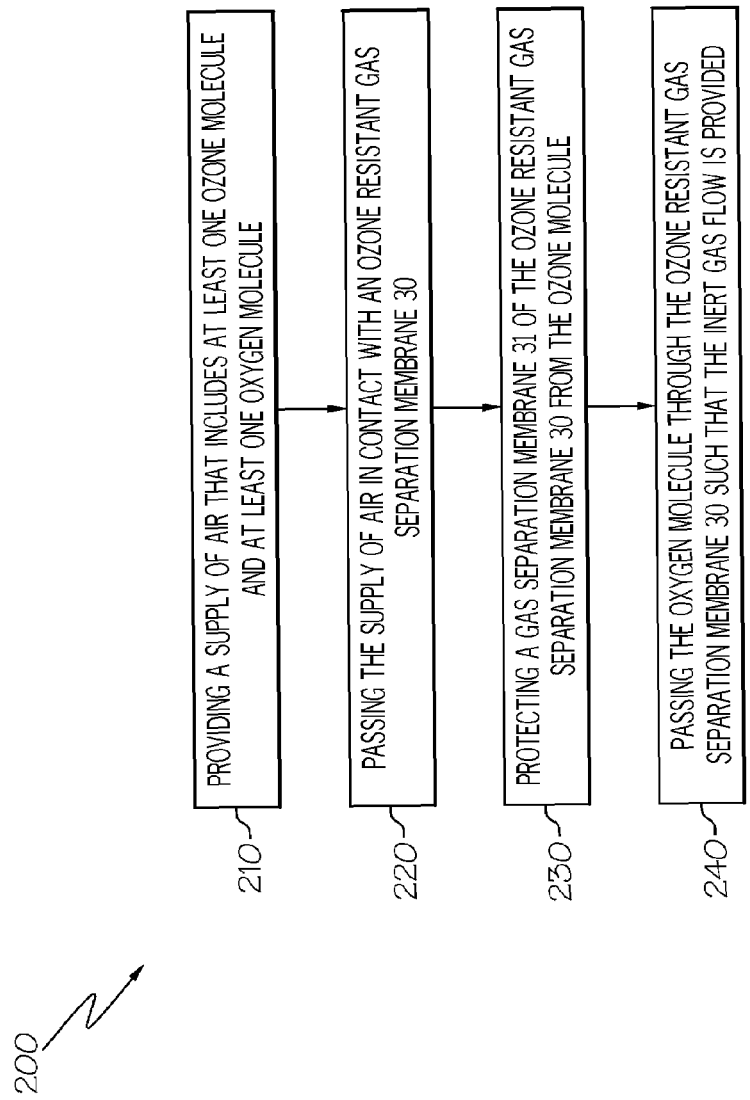
FIG. 2 is a flow chart of a method of providing an inert gas flow according to an embodiment of the present invention.

A method 200 of providing an inert gas flow is depicted in FIG. 2. The method 200 may comprise a step 210 of providing a supply of air that includes at least one ozone molecule and at least one oxygen molecule; a step 220 of passing the supply of air in contact with an ozone resistant gas separation membrane 30; a step 230 of protecting a gas separation membrane 31 of the ozone resistant gas separation membrane 30 from the ozone molecule; and a step 240 of passing the oxygen molecule through the ozone resistant gas separation membrane 30 such that the inert gas flow is provided.

The step 210 of providing a supply of air that includes at least one ozone molecule and at least one oxygen molecule can comprise providing a compressed air flow. The step 210 of providing a supply of air that includes at least one ozone molecule and at least one oxygen molecule can comprise providing an engine bleed air flow. The step 220 of passing the supply of air in contact with an ozone resistant gas separation membrane 30 can comprise passing the supply of air through an ASM of an OBIGGS. The step 230 of protecting a gas separation membrane 31 of the ozone resistant gas separation membrane 30 from the ozone molecule can comprise reacting the ozone molecule with an ozone reacting component 32 of the ozone resistant gas separation membrane 30. The step 230 of protecting a gas separation membrane 31 of the ozone resistant gas separation membrane 30 from the ozone molecule can comprise reacting the ozone molecule with an antioxidant that acts as a sacrificial reductant. The step 230 of protecting a gas separation membrane 31 of the ozone resistant gas separation membrane 30 from the ozone molecule can comprise reacting the ozone molecule with a compound that contains a double bond. The step 240 of passing the oxygen molecule through the ozone resistant gas separation membrane 30 such that the inert gas flow is provided can comprise passing the oxygen molecule such that an oxygen enriched flow is provided.

As can be appreciated by those skilled in the art, the present invention provides improved gas separation membranes. By incorporating ozone reacting components into the gas separation membrane, embodiments of the present invention can extend the useful life of the membrane. Embodiments of the present invention can protect the actual gas separating portion of the membrane from deterioration by ozone. Embodiments of the present invention can provide ozone resistant gas separation membranes.

It should be understood, of course, that the foregoing relates to exemplary embodiments of the invention and that modifications may be made without departing from the spirit and scope of the invention as set forth in the following claims.

We claim:

1. An apparatus for gas separation in an atmosphere containing ozone comprising:
   a gas separation membrane comprising;
      a support region in contact with the ozone;
      a gas separation region isolated from the ozone by interposition of the support region between the ozone and the gas separation region;
   wherein the support region comprises a sacrificial reductant for ozone;
   wherein the gas separation region does not include sacrificial reductant for ozone; and
   wherein the gas separation region is protected from oxidation from the ozone by sacrificial oxidation by the ozone.

2. The apparatus of claim 1, wherein said gas separation membrane comprises an asymmetric membrane having a porous support region having a first thickness and a separating region having a second thickness thinner than the first thickness, said sacrificial reductant for ozone incorporated in said porous region and not in said separating region.

3. The apparatus of claim 1, wherein said gas separation membrane comprises at least one of polysulfone, polyether, polyamide, polycarbonate, polyethersulfone, polysilicone, polyimide, polyetherimide, polyestercarbonate, and mixtures and copolymers thereof.

4. The apparatus of claim 1, wherein said sacrificial reductant for ozone comprises at least one of olefin and polyolefin.

5. The apparatus of claim 1, wherein said sacrificial reductant for ozone comprises less than about 10% by weight of said apparatus.

6. The apparatus of claim 1, wherein said apparatus comprises a hollow tube membrane.

7. The apparatus of claim 1, wherein said sacrificial reductant for ozone comprises between about 1% and about 5% by weight of said apparatus.

8. The apparatus of claim 1, wherein said sacrificial reductant for ozone comprises at least one of phosphite esters, organic sulfides, retinol, isoprenoid hydrocarbons, polybutadienes, polyisoprenes and aromatic amines.

9. A composite gas separation membrane comprising:
   a porous layer;
   a separating layer adjacent to said porous region; and
   a sacrificial ozone reacting component incorporated in said porous region and not in said separating region.

10. The composite gas separation membrane of claim 9, wherein an oxygen/nitrogen separation factor of said asymmetric membrane is at least about 2.

11. The composite gas separation membrane of claim 9, wherein said ozone reacting component comprises less than about 5% by weight of said asymmetric membrane.

12. The composite gas separation membrane of claim 9, wherein said ozone reacting component comprises an antioxidant that acts as a sacrificial reductant.

13. A composite gas separating membrane comprising:
   a support layer;
   a separating layer comprising polysulfone in contact with said support layer;
   an ozone reacting component comprising an isoprenoid hydrocarbon incorporated in said support layer; and
   wherein the separating layer does not comprise an isoprenoid hydrocarbon.

14. The composite gas separating membrane of claim 13, wherein the ozone reacting component comprises one of limonene or pinene.

15. The composite gas separating membrane of claim 13, said ozone reacting component comprises one of low molecular weight polybutadiene or polyisoprene.

16. The composite gas separating membrane of claim 13, wherein said composite membrane comprises a flat sheet.

17. The composite gas separating membrane of claim 13, wherein said ozone reacting component comprises less than about 10% by weight of said composite membrane.

* * * * *